US010868757B2

(12) United States Patent
Santos et al.

(10) Patent No.: US 10,868,757 B2
(45) Date of Patent: Dec. 15, 2020

(54) EFFICIENT ROUTING IN SOFTWARE DEFINED NETWORKS

(71) Applicant: Hewlett Packard Enterprise Development LP, Houston, TX (US)

(72) Inventors: Jose Renato G. Santos, Palo Alto, CA (US); Yoshio Turner, San Francisco, CA (US); Mike Schlansker, Palo Alto, CA (US); Jean Tourrilhes, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 40 days.

(21) Appl. No.: 16/200,529

(22) Filed: Nov. 26, 2018

(65) Prior Publication Data

US 2019/0097919 A1  Mar. 28, 2019

Related U.S. Application Data

(63) Continuation of application No. 15/114,902, filed as application No. PCT/US2014/035968 on Apr. 29, 2014, now Pat. No. 10,142,220.

(51) Int. Cl.
*H04L 12/703*   (2013.01)
*H04L 12/24*    (2006.01)
*H04L 12/741*   (2013.01)

(52) U.S. Cl.
CPC .......... *H04L 45/28* (2013.01); *H04L 41/0636* (2013.01); *H04L 41/0663* (2013.01); *H04L 41/0816* (2013.01); *H04L 45/745* (2013.01)

(58) Field of Classification Search
None
See application file for complete search history.

(56) References Cited

U.S. PATENT DOCUMENTS 8,976,673 B2   3/2015  Yedavalli et al.
10,142,220 B2 * 11/2018  Santos ............... H04L 41/0636
(Continued)

FOREIGN PATENT DOCUMENTS

EP           2672668 A1   12/2013
WO     WO-2013031175 A1    3/2013

OTHER PUBLICATIONS

International Search Report and Written Opinion received for PCT Application No. PCT/US2014/035968, dated Jan. 16, 2015, 10 pages.

(Continued)

*Primary Examiner* — Lonnie V Sweet
(74) *Attorney, Agent, or Firm* — Hewlett Packard Enterprise Patnet Department

(57) ABSTRACT

Example embodiments relate to providing efficient routing in software defined networks. In example embodiments, an indirect group table includes a first group entry that is associated with a first route tree in a software defined network, wherein the indirect group table affects a plurality of forwarding table entries associated with the first group entry. A failure is detected in the first route tree during a data transmission, and a notification of the failure is sent to a remote controller device, where the remote controller device identifies a second route tree that does not include the failure. After the remote controller device updates the first group entry to be associated with the second route tree, the data transmission is performed using the second route tree.

17 Claims, 5 Drawing Sheets

(56) References Cited

U.S. PATENT DOCUMENTS

| | | | |
|---|---|---|---|
| 2007/0223368 A1* | 9/2007 | Ozaki | H04L 41/0618 370/216 |
| 2010/0226285 A1* | 9/2010 | Wilfong | H04L 12/462 370/256 |
| 2010/0296517 A1* | 11/2010 | Kompella | H04L 12/44 370/408 |
| 2013/0010600 A1 | 1/2013 | Jocha et al. | |
| 2013/0024579 A1 | 1/2013 | Zhang | |
| 2013/0028070 A1 | 1/2013 | Beheshti-Zavareh | |
| 2013/0060819 A1 | 3/2013 | Lambeth et al. | |
| 2013/0094350 A1 | 4/2013 | Mandal | |
| 2013/0170495 A1 | 7/2013 | Suzuki et al. | |
| 2013/0212243 A1 | 8/2013 | Thakkar et al. | |
| 2014/0016648 A1 | 1/2014 | Hidaka | |
| 2014/0317256 A1 | 10/2014 | Jiang et al. | |
| 2015/0304216 A1* | 10/2015 | Suzuki | H04L 45/16 370/390 |
| 2016/0226782 A1 | 8/2016 | Schneider et al. | |

OTHER PUBLICATIONS

Adrian Lara, "Network Innovation using OpenFlow: A Survey," Sep. 7, 2013, http://cial.csie.ncku.edu.tw/presentation/group_pdf/(SURV%202013)%20Network%20Innovation%20using%20OpenFlow%20A%20Survey.pdf>.

Yeganeh et al, "On Scalability of Software-Defined Networking" IEEE Communications Magazine, Feb. 2013.

* cited by examiner

EFFICIENT ROUTING IN SOFTWARE DEFINED NETWORKS

CROSS-REFERENCE TO RELATED APPLICATIONS

The present application is a continuation of U.S. patent application Ser. No. 15/114,902, filed Jul. 26, 2016, which in turn claims the benefit of WO Application No. PCT/US2014/035968, filed Apr. 29, 2014, all of which are incorporated by reference herein.

BACKGROUND

A software defined network (SDN) is a computer networking methodology that has distinct systems for deciding where traffic should be sent (i.e., control plane) and forwarding the traffic to the selected destinations (i.e., data plane). In contrast, typical networking devices (e.g., switches, routers, etc.) are integrated systems that both determine destinations and forward the traffic. Because the underlying infrastructure is abstracted, the controller of an SDN can be centrally managed and programmed directly.

BRIEF DESCRIPTION OF THE DRAWINGS

The following detailed description references the drawings, wherein.

DETAILED DESCRIPTION

Figure 1:
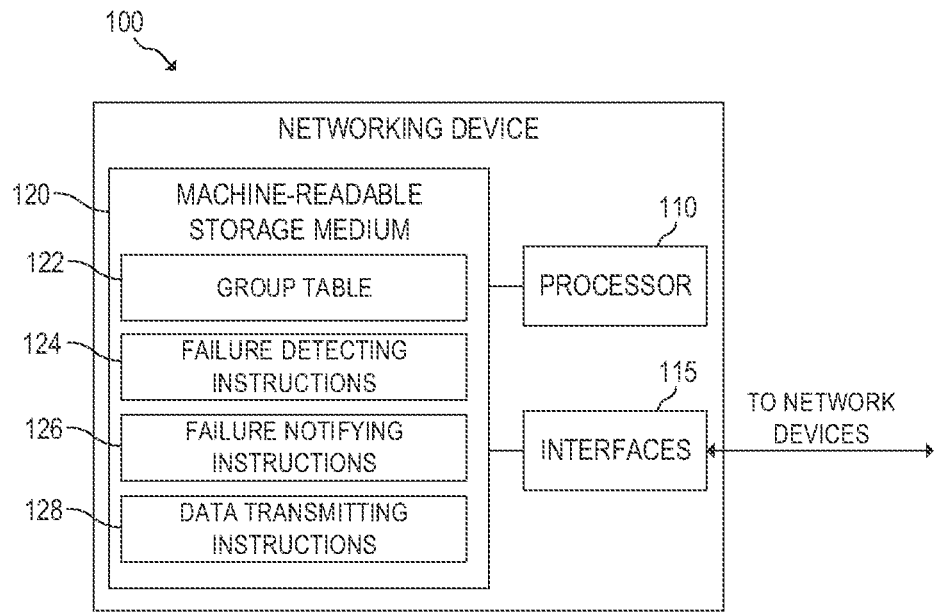
FIG. 1 is a block diagram of an example networking device for providing efficient routing in a SDN.

As discussed above, SDN allows networking infrastructure to be centrally managed and programmed. In an SDN network, every traffic flow managed by the controller is routed in the network by associating a forward action for the flow in every networking device on the flow path. Each forward action determines the networking device output port to be used for forwarding packets of that flow. In production networks, every networking device can have thousands of rules and the controller is configured to manage the rules of all networking devices. In this case, flow changes to accommodate traffic demand variations or network failures may have to update a large fraction of these rules in order to redirect traffic away from failed network segments or congested links. As the central controller recomputes numerous rules and pushes them to many networking devices, it is likely to become a choke point and cause network reconfiguration to take an excessive amount of time. Thus, the controller can add long latencies to the network reconfiguration time, and the limited processing power of existing networking device firmware can add significant latency to the recovery process.

Some SDN protocols (e.g., OPENFLOW®) introduced group tables which can be used to reduce the number of rules that need to be updated when routes need to be reconfigured. For example, one type of group table is a fast failover table that defines a set of ordered buckets, where each bucket is associated with a port. In this example, each flow can be associated with a fast failover group, and packets are routed to the first live bucket in the group, where live indicates that the corresponding port is operational. The fast failover table allows for fast route changes in the event of local link/port failures. However, the fast failover table is unable to solve a global route reconfiguration problem that uses all paths available in the network instead of being restricted to a local route detour around the network failure.

OPENFLOW® is a registered trademark of the Open Networking Foundation non-profit corporation, which is headquartered in Beaverton, Oreg. The OPENFLOW protocol provides centralized access to the forwarding plane of an SDN. The OPENFLOW protocol supports group tables as described herein.

In another example, another type of group table is an indirect group table that has a single bucket that can execute a set of actions associated with the group. A flow table entry can point to a group table entry, which then executes the actions associated with the group table entry. The group table provides a level of indirection when forwarding packets that reduces the number of rules that should be updated to reroute traffic.

Example embodiments disclosed herein provide efficient routing in SDN's. For example, in some embodiments, an indirect group table includes a first group entry that is associated with a first route tree in a software defined network. A failure is detected in the first route tree during a data transmission, and a notification of the failure is sent to a remote controller device, where the remote controller device identifies a second route tree that does not include the failure. After the remote controller device updates the first group entry to be associated with the second route tree, future data transmissions are performed using the second route tree.

Referring now to the drawings, FIG. 1 is a block diagram of an example networking device 100 for providing efficient routing in a SDN. The example networking device 100 may be a switch, a router, a hub, a repeater, a bridge, or any other electronic device suitable for providing efficient routing in a SDN. In the embodiment of FIG. 1, networking device 100 includes processor 110, interfaces 115, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 124, 126, 128 to enable providing efficient routing in a SDN, as described below. As an alternative or in addition to retrieving and executing instructions, processor 110 may include one or more electronic circuits comprising a number of electronic components for performing the functionality of one or more of instructions 124, 126, 128.

Interfaces 115 may include a number of electronic components for communicating with network device. For example, interfaces 115 may be wireless interfaces such as wireless local area network (WLAN) interfaces and/or physical interfaces such as Ethernet interfaces, Universal Serial Bus (USB) interfaces, external Serial Advanced Technology Attachment (eSATA) interfaces, or any other physical connection interface suitable for communication with the network device. In operation, as detailed below, interfaces 115 may be used to send and receive data to and from network devices.

Machine-readable storage medium 120 may be any electronic, magnetic, optical, or other physical storage device that stores executable instructions. Thus, machine-readable storage medium 120 may be, for example, Random Access Memory (RAM), Content Addressable Memory (CAM), Ternary Content Addressable Memory (TCAM), an Electrically-Erasable Programmable Read-Only Memory (EEPROM), flash memory, a storage drive, an optical disc, and the like. As described in detail below, machine-readable storage medium 120 may be encoded with executable instructions for providing efficient routing in a SDN.

Group table 122 may be an indirect group table as described above that can execute a set of actions associated with a group table entry. Multiple entries in a forwarding table (not shown) can be associated with a group table entry so that there is a layer of abstraction between the forwarding table and the set of actions (i.e., a single change to the group change entry affects all the forwarding table entries associated with that group). The set of actions performed for a group table entry typically include a forward to port action.

An entry in group table 122 can be associated with a route tree in a SDN. The route tree is a subset of the network topology that connect an arbitrary number of end-point devices. A flow consists of network traffic transferred as a sequence of data packets from one source end-point device to one destination end-point device. Each route tree defines a single path for a given flow, where the single path includes a sequence of links and switches that are used to route packets of that flow from the source to the destination end-point device. Specifically, the route tree may specify the networking devices (e.g., networking device 100) that a data transmission from a source end-point device should travel through to reach a destination end-point device. A route tree includes a root node that is a common ancestor of all the end-point devices connected by the tree. While a packet is traveling upstream towards the root node, the packet is directed toward the root through the networking devices using a corresponding group table entry. When a packet reaches a common ancestor between the source and the destination end-device, with respect to the route tree, the packet starts being routed downstream towards a leaf of the tree. The common ancestor can be the root of the tree or any other node in the tree. After the packet reaches the common ancestor, the packet is directed toward the destination end-point device through the network using a corresponding forwarding table entry.

Failure detecting instructions 124 detect failed transmissions of data packets. For example, if a neighboring networking device of networking device 100 is offline, a packet forwarded to the neighboring networking device may return a notification that the transmission has failed. In another example, the connection between a neighboring networking device and networking device 100 may be faulty (e.g., bad network cable) thereby preventing the data transmission. In the event of data transmission failure, failure detecting instructions 124 also collects metadata (e.g., error code, route tree identifier, etc.) related to the failed transmission.

Failure notifying instructions 126 send a notification of the failed transmission to a controller device (not shown) of the SDN. The notification may include metadata describing the failed transmission so that the controller device can identify the cause of the failed transmission. In response to receiving the failure notification, the controller device may select a new route tree for the data transmission, for all the route trees that contain the failed link or failed switch. In this case, controller device reconfigures a group table entry in group table 122 to be associated with the new route tree in all switch devices that are used by all route trees affected by the failure.

For each route tree affected by the failure a new route tree is selected. The new route tree for each affected route tree can be distinct or not of the other new route trees. Data transmitting instructions 128 perform future data transmissions using the new route tree. Specifically, data transmitting instructions 128 may forward a packet to a port according to the updated group table entry in group table 122 so that the data transmission travels through the new route tree. Because the new route tree does not include the failure, the data transmission can be successfully completed.

Figure 2:
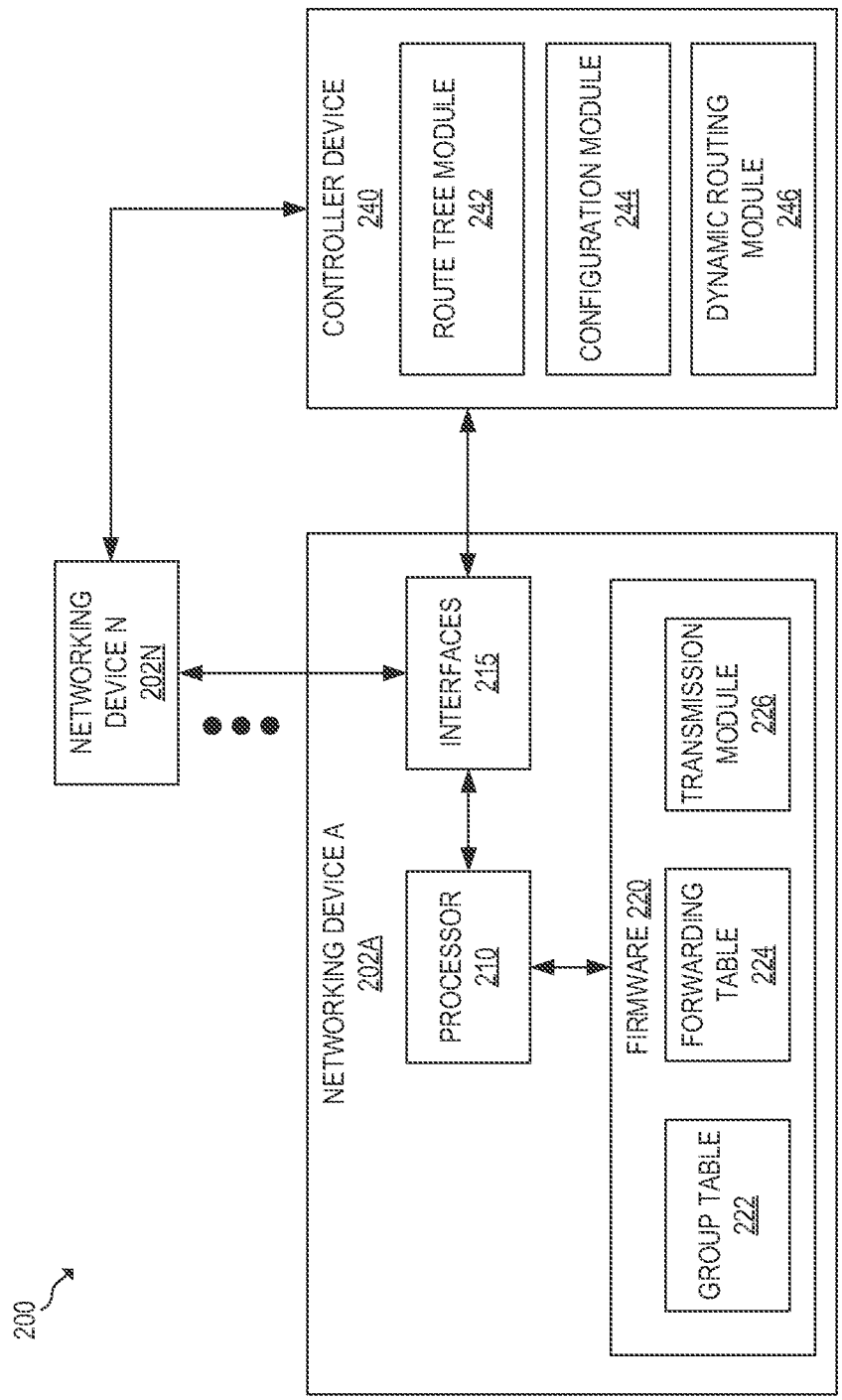
FIG. 2 is a block diagram of an example system for providing efficient routing in a SDN.

FIG. 2 is a block diagram of an example system 200 including networking devices (e.g., networking device A 202A, networking device N 202N) interacting with controller device 240 to provide a SDN. The components of the networking devices may be similar to the corresponding components of networking device 100 described with respect to FIG. 1. System 200 includes user devices networking devices (e.g., networking device A 202A, networking device N 202N) and controller device 240.

As illustrated, networking device A 202A may include processor 210, interfaces 215, and firmware 220. Processor 210 and interfaces 215 may be similar to the corresponding components of networking device 100 that are described above with respect to FIG. 1. In this example, interfaces 215 communicate with (e.g., networking device A 202A, networking device N 202N) and controller device 240. Firmware 220 may include a number of modules 222-226, where each of the modules may include a series of instructions encoded on a machine-readable storage medium, which may be similar to machine-readable storage medium 120 of FIG. 1, and executable by processor 210. In addition or as an alternative, each module may include one or more hardware devices including electronic circuitry for implementing the functionality described below. Although the components of firmware 220 are described in detail below, additional details regarding an example implementation of firmware 220 are provided above in connection with instructions 122-128 of FIG. 1.

Group table 222 stores group table entries that define group for transmitting data in corresponding route trees. Each group table entry is associated with actions that typically include a forward to port action that transmits data along its corresponding route tree. The route trees and group table 222 are configured by controller device as described below 240.

Forwarding table 224 stores forwarding table entries that define routes to destinations in the SDN. For example, a forwarding table entry may specify that packets destined for a particular destination end-point device should be forwarded to a port that is associated with a neighboring network device. In another example, a forwarding table entry may point to a group table entry, which can be used to route traffic from networking device A 202A.

Transmission module 226 forwards data packets to other devices in the SDN based on entries in group table 222 and forwarding table 224. Specifically, the destination of a packet may be used to query the forwarding table 224 to determine which port of networking device A 202A should be used to forward the packet. For example, transmission module 226 may use a group table entry to forward the packet upstream toward the root of a route tree associated with the group table entry. In another example, transmission module 226 may use a forwarding table entry to forward the packet downstream toward the destination end-point device of the route tree.

Transmission module 226 is also configured to detect transmission failures. In the event of a failure, transmission module 226 can collect metadata associated with the failure for sending in a transmission failure notification to controller device 240.

System 200 may include any number of networking devices (e.g., networking device A 202A, networking device N 202N) that are arranged in a variety of topologies. Each of the networking devices may be substantially similar to networking device A 202A. Specifically, each of the networking devices is compliant with an SDN protocol that supports indirect group tables (e.g., group table 222).

Controller device 240 may be a computing device that configured to manage an SDN including end-point devices (not shown) and networking devices (e.g., networking device A 202A, networking device N 202N). Controller device 240 may be, for example, a server, a networking device, or any other computing device suitable for managing traffic flow of an SDN. In this example, controller device 240 includes route tree module 242, configuration module 244, and dynamic routing module 246.

Route tree module 242 determines route trees for directing traffic in an SDN. Specifically, route tree module 242 creates a set of route trees that cover the network topologies and minimizes the number of links and switches shared among different trees, such that there is always a route tree available given an arbitrary single switch or link failure. Route tree module 242 also selects one of the route trees for each flow of traffic. A flow can be defined for a pair of source and destination end-point devices as an application TCP connection or other conventional ways of identifying a flow of data packets between a source and a destination device. In some cases, route tree module 242 allows an administrator to manually configure the route trees connecting the end-point devices. Each route tree can span all or only a subset of the end-point devices as long as all the route trees together span over all end-point devices. In other cases, route tree module 242 may automatically determine the route trees based on the topology on SDN. In either case, route tree module 242 is configured to determine route trees with minimal overlap to minimize the effect of failures in the SDN.

Configuration module 244 configures networking devices (e.g., networking device A 202A, networking device N 202N) with the route trees determined by route tree module 242. For example, a route tree can be processed by iterating through each networking device in the route tree and adding entries to the group table and/or forwarding table of the networking device according to the route tree.

Dynamic routing module 246 reconfigures the flow of traffic in the SDN. For example, if there is a failure in the SDN, dynamic routing module 246 may replace route trees that include the failure with other route trees. In another example, if a route tree has excessive traffic, some of the source and destination end-point device pairs of the overly loaded route tree may be migrated to a less busy route tree.

Figure 3:
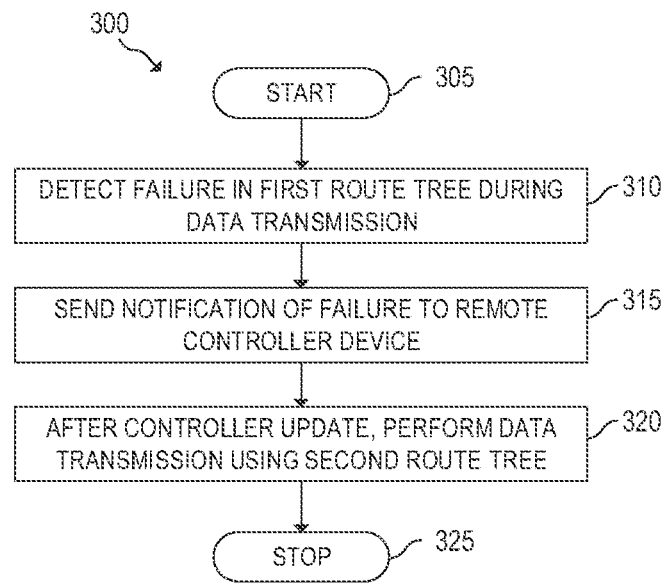
FIG. 3 is a flowchart of an example method for execution by a networking device for providing efficient routing in a SDN.

FIG. 3 is a flowchart of an example method 300 for execution by a networking device 100 for providing efficient routing in a SDN. Although execution of method 300 is described below with reference to networking device 100 of FIG. 1, other suitable devices for execution of method 300 may be used such as networking device A 202A of FIG. 2. Method 300 may be implemented in the form of executable instructions stored on a machine-readable storage medium, such as computer readable medium 120 of FIG. 1, and/or in the form of electronic circuitry.

Method 300 may start in block 305 and continue to block 310, where networking device 100 detects a failed transmission of a data packet. The failure may be due to a neighboring networking device being offline or a faulty connection. In block 315, networking device 100 sends a notification of the transmission failure to a controller of the SDN. The notification can include metadata that the controller uses to identify the source of the transmission failure. The controller may then dynamically update the SDN to route the failed transmission around the failure.

In block 320, networking device 100 performs the data transmission using a new route tree specified by the controller. Method 300 may then continue block 325, where method 300 may stop.

Figure 4:
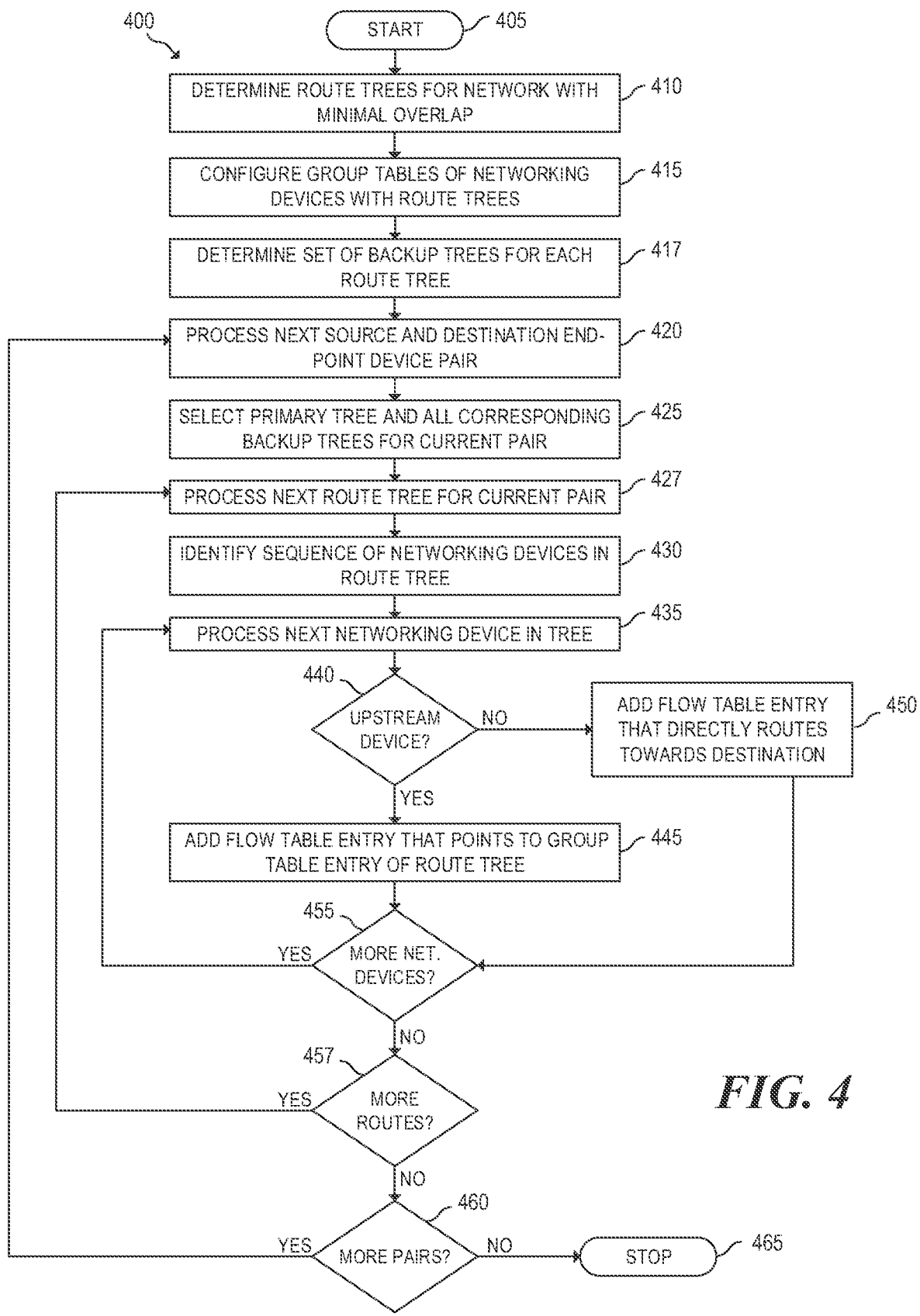
FIG. 4 is a flowchart of an example method for execution by a controller device for configuring an SDN with efficient routing rules.

FIG. 4 is a flowchart of an example method 400 for execution by a controller device 240 for configuring an SDN with efficient routing rules. Although execution of method 400 is described below with reference to controller device 240 of FIG. 2, other suitable devices for execution of method 400 may be used. Method 400 may be implemented in the form of executable instructions stored on a machine-readable storage medium and/or in the form of electronic circuitry.

Method 400 may start in block 405 and continue to block 410, where controller device 240 determines route trees, each of which connects all the end-devices or a subset of the end devices. Each end-point device should be reached by multiple route trees such that the device is guaranteed to have a tree available in the presence of any single component failure. For example, the route trees may be configured to have minimal overlap by an administrator of the SDN. In block 415, the group tables of the networking devices are configured according to the determined route trees. Specifically, for each of the networking devices in a route tree except for the root node, a group table entry associated with the route tree can be added to the group table of the networking device. The group table entry forwards network traffic on a networking device towards the root of the route tree. In block 417, a set of backup route trees is determined for each of the route trees determined in block 415. The set of backup trees should provide connectivity for all end-point device pairs for which there exists a physical path connecting the pairs in the physical topology after an arbitrary failure.

In block 420, the next source and destination end-point device pair is processed. Each pair in the SDN is processed iteratively. In block 425, a primary route tree and all its corresponding backup route trees are determined for the source destination pair. Various considerations may be considered when selecting the route tree such as load-balancing, fault redundancy, etc. In block 427, the next route tree for the source destination pair is processed. In block 430, the sequence of networking devices in the route tree is identified.

In block 435, the sequence of networking devices are iterated through by processing the next networking device in the route tree. In block 440, controller device 240 determines if the current networking device is an upstream device in the tree route. Upstream devices forward traffic up its corresponding route tree towards the root. If the current networking device is an upstream device, a flow table entry is added to the forwarding table of the current networking device that points to the group table entry associated with the route tree in block 445. If the current networking device is not an upstream device, a flow table entry is added to the forwarding table of the current networking device that routes traffic directly towards the destination end-point device of the route tree in block 450.

In block 455, controller device 240 determines if there are more networking devices in the selected route tree to process. If there are more networking devices to process, method 400 returns to block 435 to process the next networking device. In block 457, controller device 240 determines if there are more route trees for the source destination pair to process. If there are more route trees to process, method 400 returns to block 427 to process the route tree. By processing each of the route trees as described above, additional flow table entries and/or flow tables are created when configuring the network so that a flow can be quickly rerouted to a different route tree by simply updating the appropriate group table entry (i.e., no flow table entries are updated or created while rerouting).

In block 460, controller device 240 determines if there are more source destination pairs to process. If there are more source destination pairs to process, method 400 returns to block 420 to process the next source destination pair. After all the source destination pairs have been processed, method 400 may continue block 465, where method 400 may stop.

Figure 5:
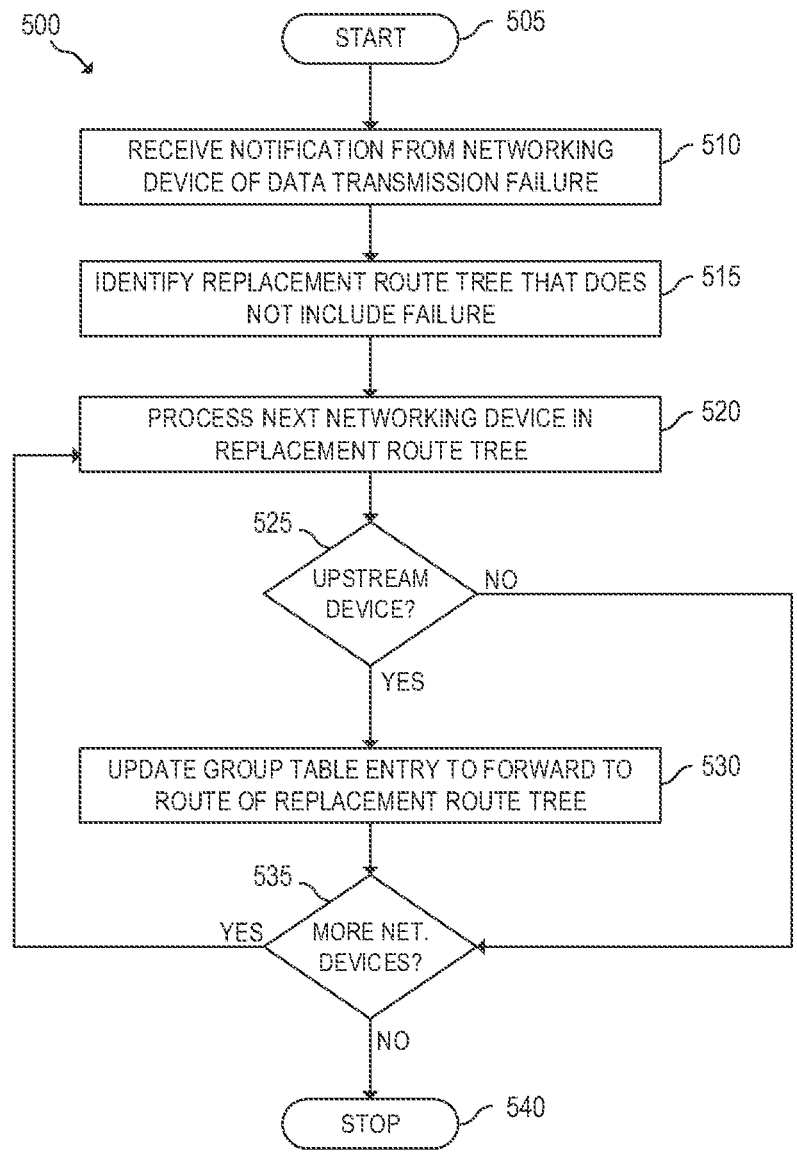
FIG. 5 is a flowchart of an example method for execution by a controller device for resolving a failure in an SDN.

FIG. 5 is a flowchart of an example method 500 for execution by a controller device 240 for resolving a failure in an SDN. Although execution of method 500 is described below with reference to controller device 240 of FIG. 2, other suitable devices for execution of method 500 may be used. Method 500 may be implemented in the form of executable instructions stored on a machine-readable storage medium and/or in the form of electronic circuitry.

Method 500 may start in block 505 and continue to block 510, where controller device 240 receives a notification from a networking device of a data transmission failure. The notification is used to identify a failure (e.g., offline networking device, failed connection, etc.). In block 515, a replacement route tree is selected from the set of backup trees for each tree affected by the failure, where the replacement route tree does not include the component that failed.

In block 520, each of the networking devices in the replacement route tree may be processed iteratively. In block 525, controller device 240 determines if the current networking device in the replacement route tree is an upstream device. If the current networking device is an upstream device, the group table entry for the failed route tree may be updated to be associated with the replacement route tree in block 530. If the current networking device is not an upstream device, no updates are performed to account for the replacement route tree because the downstream configurations of networking devices have been pre-configured in all backup trees associated with the failed primary tree, as described with respect to step 450 of FIG. 4.

In block 535, controller device 240 determines if there are more networking devices in the replacement route tree to process. If there are more networking devices to process, method 500 returns to block 520 to process the networking device. If there are no more networking devices to process, method 500 may continue block 540, where method 500 may stop.

In some cases, congruent route trees can be used to spread the load of a route tree in the event of a failure. Congruent route trees are identical route trees that are configured on the network such that if a failure occurs along the flow of the trees, traffic of each of the congruent route trees can be rerouted to different route trees to help ensure that the replacement route trees are not overloaded.

Figure 6:
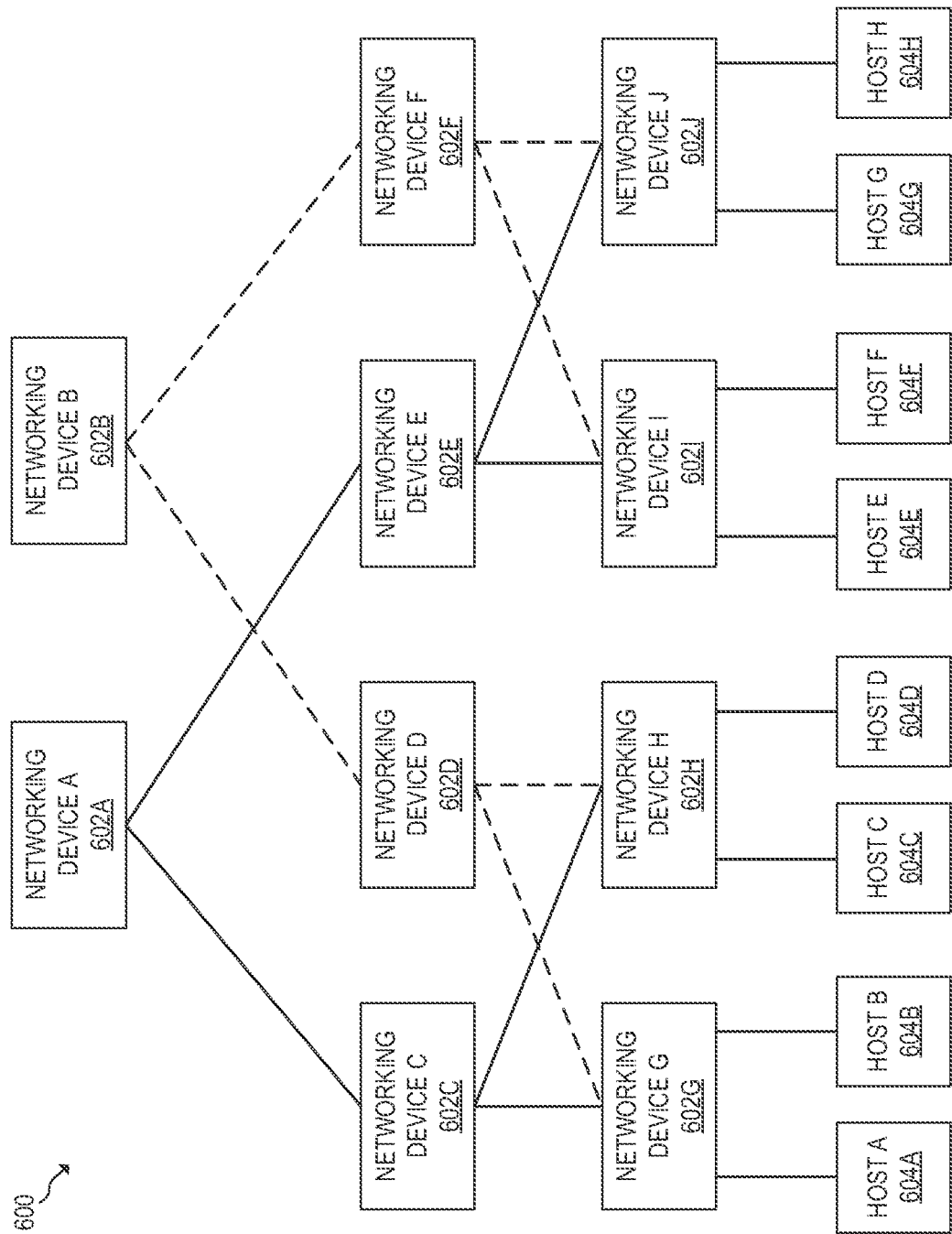
FIG. 6 is a block diagram of an example SDN showing route trees for efficient routing.

FIG. 6 is a block diagram of an example SDN 600 showing route trees for efficient routing. The SDN 600 includes network devices 602A-602J and hosts 604A-604H (i.e., end-point devices).

As shown by the solid connection lines, a first route tree in SDN 600 includes networking device A 602A, networking device C 602C, networking device E 602E, networking device G 602G, networking device H 602H, networking device I 602I, and networking device J 602J. As shown by the dashed connection lines, a second route tree in SDN 600 includes networking device B 602B, networking device D 602D, networking device F 602F, networking device G 602G, networking device H 602H, networking device I 602I, and networking device J 602J. The route trees have minimal overlap in their connections between network devices and connect each host to every other host, allowing traffic to be moved from the first tree to the second tree in the event of a failure.

For example, if the connection between networking device C 602C and networking device G 602G fails, traffic could no longer be routed on the first route tree from host A 604A to host H 604H. In this example, the second route tree could be associated with a group table entry in networking device G 602G to reroute the traffic through the second route tree as described above with respect to FIG. 5.

The foregoing disclosure describes a number of example embodiments for providing efficient routing in a SDN. In this manner, the embodiments disclosed herein facilitate efficient routing in a SDN by transferring using an indirect group table to add a layer of abstraction to forwarding rules of networking devices.

We claim:

1. A method for efficient routing in software defined networks, the method comprising:
   receiving a notification of a failure in a first route tree of a plurality of route trees from a networking device, wherein the networking device is configured to store a first group entry that is associated with the first route tree, and wherein the plurality of route trees is configured to minimize overlap between each of the plurality of route trees in a software defined network;
   identifying a second route tree of the plurality of route trees that does not include the failure; and
   updating the first group entry in an indirect group table of the networking device to be associated with the second route tree, wherein the indirect group table affects a plurality of forwarding table entries associated with the first group entry, and wherein updating the first group entry does not update the plurality of forwarding table entries.

2. The method of claim 1, further comprising:
   identifying a second networking device in the second route tree, the second networking device configured to store the indirect group table;
   determining that the second networking device is an upstream device; and
   updating the indirect group table to be associated with the second route tree responsive to the determination that the second networking device is an upstream device.

3. The method of claim 1, further comprising:
   detecting a level of traffic along the second route tree;
   identifying a third route tree based on the level of traffic; and
   updating the first group entry in the indirect group table of the networking device to be associated with the third route tree.

4. The method of claim 1, wherein the plurality of forwarding tables include an entry referencing the first group entry of the indirect group table.

5. The method of claim 1, further comprising:
determining the plurality of route trees for each source and destination end-point device pair in the software defined network, wherein the plurality of trees includes the first route tree and the second route tree.

6. The method of claim 1, wherein the first group entry is referenced in a plurality of forwarding table entries stored in the memory.

7. The method of claim 1, wherein the notification of a failure includes an error code and a route tree identifier associated with the failure.

8. A non-transitory machine-readable storage medium encoded with instructions executable by a processor for providing efficient routing in software defined networks, the machine-readable storage medium comprising instructions to:
determine a plurality of route trees for each source and destination end-point device pair in a software defined network;
receive a notification of a failure in a first route tree of the plurality of route trees from a networking device, wherein the networking device comprises a first group entry that is associated with the first route tree;
identify a second route tree of the plurality of route trees that does not include the failure; and
update a first group entry in an indirect group table of the networking device to be associated with the second route tree, wherein the indirect group table affects a plurality of forwarding table entries associated with the first group entry, wherein the computing networking device performs a data transmission using the second route tree, and wherein updating the first group entry does not update the plurality of forwarding table entries.

9. The non-transitory machine-readable storage medium of claim 8, the machine-readable storage medium further comprising instructions to:
identify a second networking device in the second route tree, the second networking device configured to store the indirect group table;
determine that the second networking device is an upstream device; and
update the indirect group table to be associated with the second route tree responsive to the determination that the second networking device is an upstream device.

10. The non-transitory machine-readable storage medium of claim 8, the machine-readable storage medium further comprising instructions to:
detect a level of traffic along the second route tree;
identify a third route tree based on the level of traffic; and
update the first group entry in the indirect group table of the networking device to be associated with the third route tree.

11. The non-transitory machine-readable storage medium of claim 8, wherein the plurality of forwarding tables include an entry referencing the first group entry of the indirect group table.

12. A networking device for providing efficient routing in software defined networks, comprising:
a memory comprising an indirect group table with a first group entry that is associated with a first route tree of a plurality of route trees in a software defined network, wherein the indirect group table affects a plurality of forwarding table entries associated with the first group entry, and wherein the plurality of route trees is configured to minimize overlap between each of the plurality of route trees;
a processor operatively connected to the memory, the processor to:
detect a failure in the first route tree during a data transmission;
send a notification of the failure to a remote controller device, wherein the remote controller device identifies a second route tree of the plurality of route trees that does not include the failure; and
after the remote controller device updates the first group entry to be associated with the second route tree, perform the data transmission using the second route tree, wherein updating the first group entry does not update the plurality of forwarding table entries.

13. The networking device of claim 12, wherein detect a failure further comprises collecting an error code and a route tree identifier associated with the failure.

14. The networking device of claim 12, wherein the first group entry is referenced in a plurality of forwarding table entries stored in the memory.

15. The networking device of claim 12, wherein the processor is further configured to:
detect a level of traffic along the second route tree;
identify a third route tree based on the level of traffic; and
update the first group entry in the indirect group table of the networking device to be associated with the third route tree.

16. The networking device of claim 12, wherein the processor is further configured to determine the plurality of route trees for each source and destination end-point device pair in the software defined network, wherein the plurality of trees includes the first route tree and the second route tree.

17. The networking device of claim 12, wherein the software defined network uses OpenFlow communications protocol.

* * * * *